(12) United States Patent
Staiger et al.

(10) Patent No.: US 8,984,949 B2
(45) Date of Patent: Mar. 24, 2015

(54) PRESSURE SENSOR MEASURING ELEMENT AND PRESSURE SENSOR PROVIDED WITH THE LATTER

(75) Inventors: Ulrich Staiger, Stein am Rhein (CH); Peter Dias-Lalcaca, Wolfhausen (CH); Peter Hauri, Hombrechtikon (CH); Dieter Zeisel, Forch (CH)

(73) Assignee: Trafag AG, Mannedorf (CH)

( * ) Notice: Subject to any disclaimer, the term of this patent is extended or adjusted under 35 U.S.C. 154(b) by 478 days.

(21) Appl. No.: 13/380,785

(22) PCT Filed: Jun. 10, 2010

(86) PCT No.: PCT/EP2010/058163
§ 371 (c)(1),
(2), (4) Date: Jan. 26, 2012

(87) PCT Pub. No.: WO2010/149501
PCT Pub. Date: Dec. 29, 2010

(65) Prior Publication Data
US 2012/0137786 A1   Jun. 7, 2012

(30) Foreign Application Priority Data
Jun. 26, 2009   (DE) .................. 10 2009 030 702

(51) Int. Cl.
*G01L 7/08*   (2006.01)
*G01L 9/04*   (2006.01)
(Continued)

(52) U.S. Cl.
CPC ............. *G01L 9/006* (2013.01); *G01L 19/0645* (2013.01); *G01L 23/18* (2013.01); *G01L 19/0681* (2013.01)
USPC ............... 73/715; 73/720; 73/114.38; 73/726

(58) Field of Classification Search
CPC ....... G01L 9/006; G01L 9/0054; G01L 23/18; G01L 19/0046; G01L 19/0038; G01L 19/0645; G01L 19/0681
USPC .................................. 73/756, 760, 715–724
See application file for complete search history.

(56) References Cited

U.S. PATENT DOCUMENTS 2,472,045 A * 5/1949 Gibbons ...................... 73/726
4,382,377 A   5/1983 Kleinschmidt et al.
(Continued)

FOREIGN PATENT DOCUMENTS

DE   198 47 793 A1   7/1999
DE   101 31 688 A1   7/2002
(Continued)

OTHER PUBLICATIONS

"Diaphragm". Oxforddictionaries.com. Accessed [online] Sep. 10, 2014.   <http://www.oxforddictionaries.com/us/definition/american_english/diaphragm>.*
(Continued)

*Primary Examiner* — Lisa Caputo
*Assistant Examiner* — Jonathan Dunlap
(74) *Attorney, Agent, or Firm* — Global IP Counselors, LLP

(57) ABSTRACT

A pressure sensor measuring element for a pressure sensor operates to detect pressure in a combustion space of an internal combustion engine. The pressure sensor measuring element includes a separating diaphragm, a plunger for the transmission of deflections of the separating diaphragm to a force measuring element, and with a sleeve which receives the plunger. The sleeve is closed by the separating diaphragm at a first end intended to face the combustion space and is designed to hold the force measuring element at the opposite second end. Accordingly, the pressure sensor measuring element can be produced more cost-effectively. Furthermore, the plunger can be produced in one piece with the separating diaphragm as a diaphragm/plunger unit, and the sleeve and the diaphragm/plunger unit can be formed from the same metal material.

20 Claims, 8 Drawing Sheets

(51) Int. Cl.
*G01M 15/00* (2006.01)
*G01L 9/00* (2006.01)
*G01L 19/06* (2006.01)
*G01L 23/18* (2006.01)

(56) References Cited

U.S. PATENT DOCUMENTS

| | | | |
|---|---|---|---|
| 5,199,303 A | 4/1993 | Benedikt et al. | |
| 5,222,397 A * | 6/1993 | Kodama | 73/756 |
| 5,331,857 A * | 7/1994 | Levine et al. | 73/756 |
| 5,559,280 A * | 9/1996 | Kovacich et al. | 73/35.13 |
| 5,703,282 A | 12/1997 | Kuesell et al. | |
| 6,487,898 B1 * | 12/2002 | Haefner et al. | 73/114.18 |
| 6,655,216 B1 | 12/2003 | Aizawa | |
| 7,497,125 B2 * | 3/2009 | Toyoda | 73/715 |
| 7,555,957 B2 * | 7/2009 | Toyoda | 73/715 |
| 2006/0090566 A1 | 5/2006 | Oda | |
| 2008/0060440 A1 * | 3/2008 | Toyoda | 73/715 |
| 2008/0060441 A1 * | 3/2008 | Toyoda | 73/723 |

FOREIGN PATENT DOCUMENTS

| | | |
|---|---|---|
| DE | 10 2005 060652 A1 | 6/2007 |
| EP | 1 255 099 A2 | 11/2002 |
| JP | 2006125982 A | 5/2006 |

OTHER PUBLICATIONS

International Search Report of corresponding International Application No. PCT/EP2010/058163, dated on Nov. 11, 2010.
German Office Action of the Corresponding German Application No. 10 2009 030 702.8-52, dated Feb. 25, 2010.

* cited by examiner

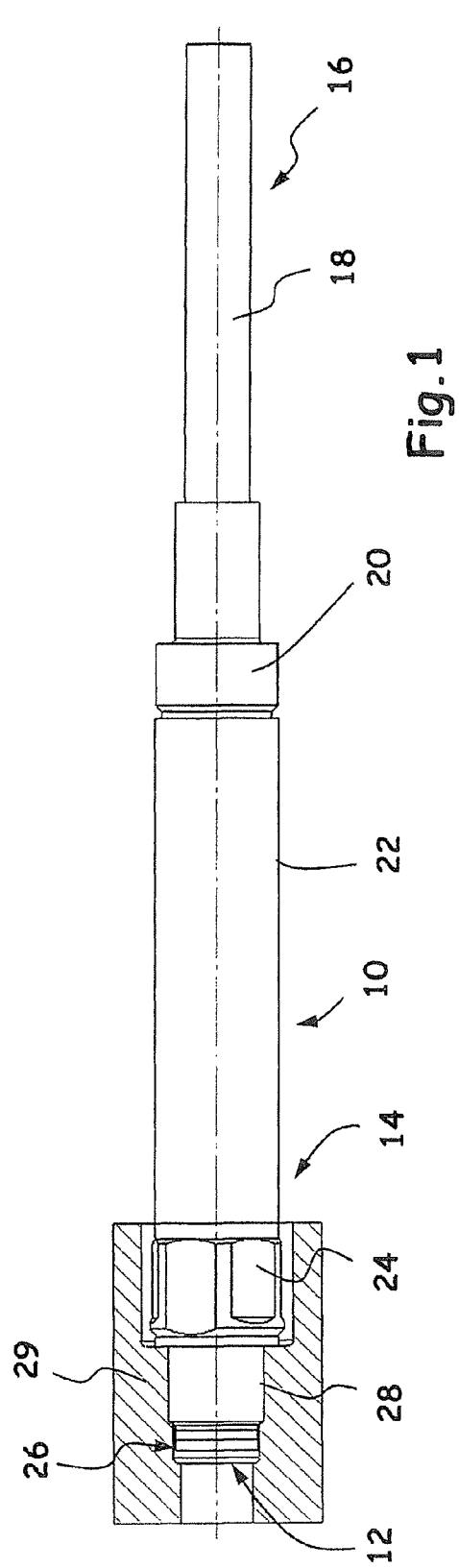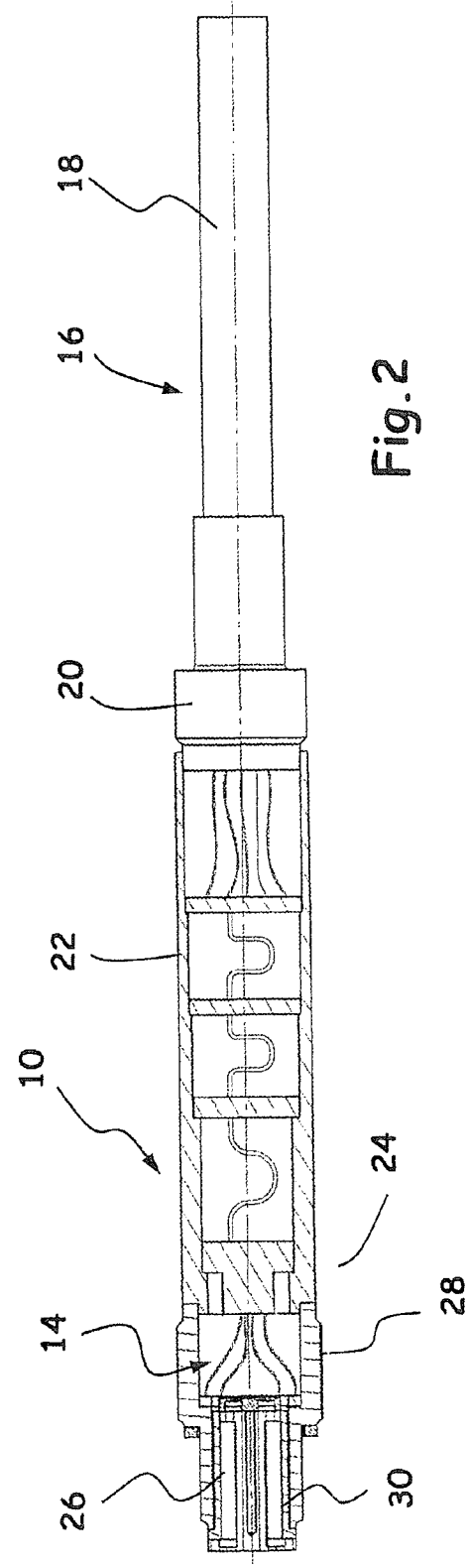

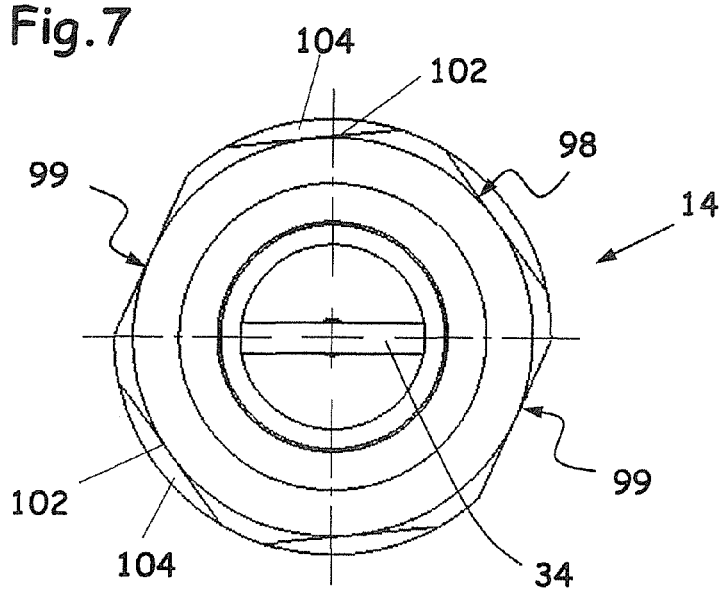
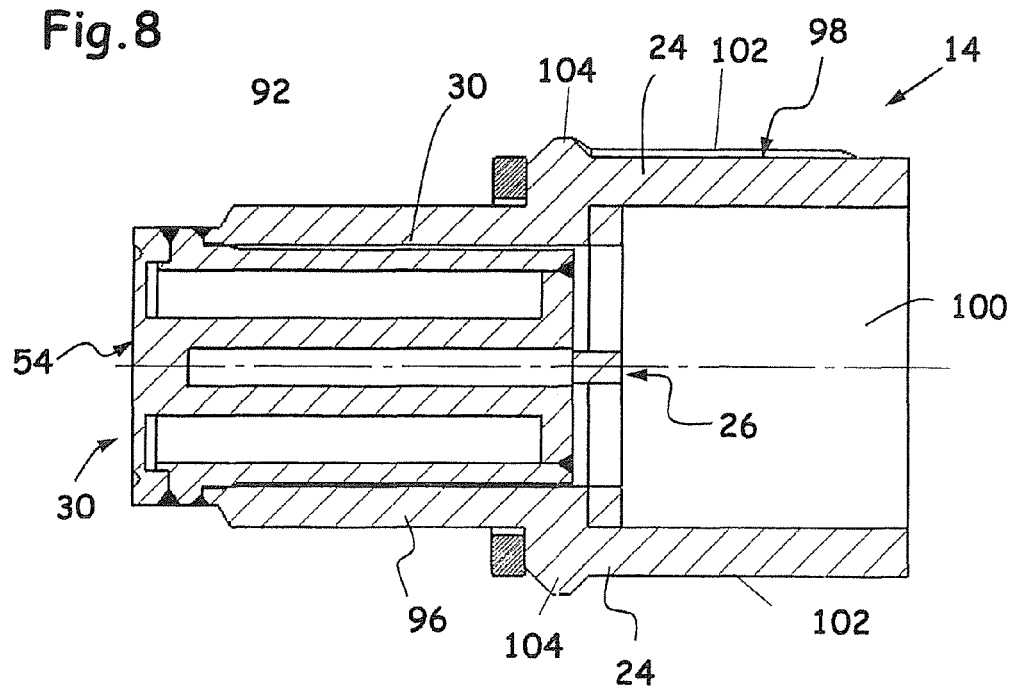

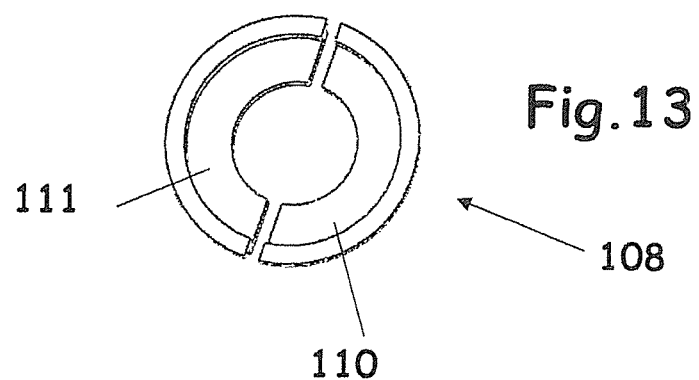

PRESSURE SENSOR MEASURING ELEMENT AND PRESSURE SENSOR PROVIDED WITH THE LATTER

CROSS-REFERENCE TO RELATED APPLICATIONS

This U.S. National stage application claims priority under 35 U.S.C. §119(a) to German Patent Application No. 10 2009 030 702.8, filed in Germany on Jun. 26, 2009, the entire contents of which are hereby incorporated herein by reference.

BACKGROUND

1. Field of the Invention

The invention relates to a pressure sensor measuring element for a pressure sensor for the detection of pressure in a combustion space of an internal combustion engine during the operation of the latter, with a separating diaphragm, with a plunger for the transmission of deflections of the separating diaphragm to a force measuring element, and with a sleeve which receives the plunger and which is closed by means of the separating diaphragm at a first end intended to face the combustion space and is designed for carrying the force measuring element at the opposite second end. The invention relates, moreover, to a pressure sensor, provided with such a pressure sensor measuring element, for measuring the combustion space pressure in an internal combustion engine by means of such a pressure sensor measuring element.

2. Background Information

Such a pressure sensor and such a pressure sensor measuring element are known from EP 1 255 099 81. This publication will be dealt with in more detail hereafter.

U.S. Pat. No. 4,382,377 A describes a pressure sensor for an internal combustion engine in order to measure the internal pressure there in a combustion space. For this purpose, the known pressure sensor has a sensor outer housing which can be screwed into a threaded bore of a combustion chamber wall (that is to say, for example, a cylinder head). At the first end intended to face the combustion space, the sensor outer housing is closed by means of a separating diaphragm which can be deflected by the combustion space pressure. The separating diaphragm is produced in one piece with the sensor outer housing. The deflection of the separating diaphragm is transmitted via a plunger, which is guided directly inside a slender threaded region of the sensor outer housing, to a second end which faces away from the combustion space and where a force measuring element converts the longitudinal movement of the plunger into pressure signals. The pressure sensor thus has a very simple set-up, the sensitive force measuring element being accommodated in a protected region outside the high combustion space temperatures. For this purpose, the plunger is produced from a ceramic having poor thermal conductivity. However, such a pressure sensor may have considerable temperature dependencies, since the sensor housing may expand differently in relation to the plunger in the case of the temperature gradients which prevail on the combustion space wall. Moreover, loads exerted upon the sensor housing when the latter is being screwed in, this being carried out with appreciable torque for the purpose of gas-tightness, may lead to a falsification of the plunger deflection and therefore to errors in pressure measurement.

A comparable set-up of a combustion space pressure sensor with a metal or ceramic plunger guided directly in a sensor housing is known from U.S. Pat. No. 5,703,282 A. In this case, however, the separating diaphragm is not produced in one piece with the sensor housing, but instead is welded to that end of the latter which is on the combustion space side so as to hermetically close this end. A comparable set-up is also to be found in U.S. Pat. No. 5,199,303 A.

In order to mitigate the abovementioned temperature dependencies, the pressure sensor for combustion spaces of internal combustion engines according to the initially mentioned EP 1 255 099 B1 was proposed. In this case, the sensor outer housing has arranged inside it a separate pressure sensor measuring element having a sleeve which forms a spacer element and in which the plunger is guided. This sleeve is fastened with its first end intended to face the combustion space to the sensor outer housing. The sleeve is not fastened at the second end lying internally and there carries a force measuring element to which the deflection of the separating diaphragm is transmitted by means of the plunger. Both the plunger and the sleeve are manufactured from ceramic in order to block the high combustion space temperatures and also temperature shocks. This combustion space sensor functions very well and has proved appropriate in practice. However, it is relatively costly to produce.

SUMMARY

Proceeding from the prior art according to EP 1 255 099 B1, the object of the invention is to improve a pressure measuring cell in such a way that more cost-effective production is possible along with uniform or improved accuracy and temperature independence.

A pressure sensor provided therewith for pressure measurement in combustion spaces of internal combustion engines (for example, ignition pressure sensor), which has such a pressure sensor measuring element according to the invention.

The invention provides a pressure sensor measuring element for a pressure sensor for the detection of pressure in a combustion space of an internal combustion engine during the operation of the latter. So that the high temperature and pressure fluctuations prevailing there can be controlled, the pressure sensor measuring element is provided with a separating diaphragm, with a plunger for the transmission of deflections of the separating diaphragm to a force measuring element, and with a sleeve which receives the plunger and which is closed by means of the separating diaphragm at a first end intended to face the combustion space and is designed for carrying the force measuring element at the opposite second end. In order to provide a simple set-up, there is provision, further, for the plunger to be produced in one piece with the separating diaphragm as a diaphragm/plunger unit, both the sleeve and the diaphragm/plunger unit being formed from metal, specifically both from the same material.

A pressure measuring cell with a minimal number of parts can consequently be produced. Even only two parts are sufficient for forming the pressure measuring cell. Separation points between the diaphragm and plunger are avoided, and no fastening has to take place. The selection of metal as material lowers the costs, as compared with ceramic. Surprisingly, it became apparent, during tests, that sufficient temperature shielding can be achieved in spite of the choice of metal for the sleeve and plunger. In particular, the good heat dissipation of the metal of the sleeve can be utilized to dissipate heat via an outer sensor housing.

For example, when the combustion space sensor is arranged near a coolant line for cooling the internal combustion engine, the cooling action can be utilized even into the interior of the pressure sensor.

The unity of material ensures a uniform expansion of the sleeve and diaphragm/plunger element. Thus, not only are adverse effects caused by different thermal expansion of the sleeve and plunger avoided, but also possible irregular thermal expansions of the separating diaphragm in relation to the sleeve and in relation to the plunger are avoided.

In an advantageous refinement of the invention, there is provision for the diaphragm/plunger unit likewise to have in one piece, at that end of the plunger which is opposite the separating diaphragm, a second diaphragm which is flush with the second end of the sleeve. This serves particularly for the greater safety and/or shielding of the force measuring sensor technology from the conditions prevailing in the combustion space.

According to a further advantageous refinement of the invention, there is provision for the diaphragm/plunger unit to be manufactured monolithically from one piece. Any separation points can thereby be avoided. Despite simple production, a safe and reliable component is obtained, which series both as a diaphragm and for transmitting the diaphragm movement into a region shielded from the combustion space.

According to a further advantageous refinement of the invention, there is provision for the pressure sensor measuring element designed, for example, as a pressure measuring cell to be manufactured overall from a uniformly identical material, to be precise metal and, in particular, steel.

In a further advantageous refinement, there is provision for a force measuring element to be fastened, on the one hand, to the second end of the sleeve and, on the other hand, indirectly or directly to that end of the plunger which faces away from the separating diaphragm, and to be manufactured from the same material as the sleeve and the diaphragm/plunger unit. In particular, the force measuring element is designed as a flexural beam with a strain gauge. Such force measuring elements are basically known, for example from the initially mentioned EP 1 255 099 B1. However, such a force measuring element is especially advantageous when it is used in the pressure sensor measuring element according to the invention, since it can be manufactured from the same material as the pressure sensor measuring element according to the invention, so that inaccuracies on account of a different thermal expansion are also avoided between the sleeve and the diaphragm/plunger unit, on the one hand, and the force measuring element, on the other hand.

In a further preferred refinement of the invention, there is provision for the sleeve to have at its first end a radially outward-extending flange and an annular projection projecting from the flange with a smaller outside diameter axially in the direction of the separating diaphragm, and for the separating diaphragm to have an outer thickened annular edge region which is flush with the flange on the outside and engages over the annular projection on the inside. As a result, it becomes easier to join the two individual parts of the pressure sensor measuring element together, and gas-tightness is increased. Moreover, a large material mass is provided exactly at the point where the sleeve is advantageously to be connected to a sensor outer housing. This increases stability and facilitates the transmission of heat from the sleeve to the sensor outer housing. In particular, the flange can also be utilized as a stop as far as which the sleeve can be introduced into the sensor outer housing. Exact positioning and sealing off of the interface between the sensor outer housing and pressure sensor measuring element are consequently facilitated.

In a further advantageous refinement of the invention, there is provision for the sleeve and the separating diaphragm to be fastened to one another in a materially integral manner, in particular by welding. Good gas-tightness and reliable fastening can thereby be achieved cost-effectively.

In a further advantageous refinement of the invention, there is provision for a cavity between the sleeve and the diaphragm/plunger unit to be evacuated or to have a filling with solid particles composed of a material with a higher melting point than combustion space temperatures.

Evacuation has the advantage that convection is prevented. Filling with, for example, refractory solid particles, such as, for example, with silica sand, has the advantage that the sensor interior and the surroundings are protected even in the event of a fracture of the front diaphragm (safety under front diaphragm fracture).

According to further advantageous refinement, the pressure measuring cell may also be provided with a radiation barrier in order to shield the sensor interior against heat radiation or other disturbing radiation. Preferably, the radiation barrier is slit in two parts so that it can be installed in the cavity more simply.

In a further advantageous refinement of the invention, there is provision for the plunger to have a longitudinal bore accessible from the second end and extending in the longitudinal direction. A measuring probe, in particular for temperature measurement, can be introduced into this bore. On account of the metal material, a temperature change can be measured relatively quickly even from inside. If, for example, a high temperature rise occurs (heat wave), this can be detected earlier by means of a probe. A rapid signal can be generated which can be used, for example, for temperature compensation for the purpose of compensating temperature dependencies possibly arising in spite of the special set-up.

A pressure sensor provided with such a pressure sensor measuring element can be produced relatively cost-effectively and, because of its simple set-up, is also very reliable. The fewer parts a sensor has, the less likely is the risk that a part fails. The pressure sensor is nonetheless highly suited to the detection of pressure in a conduction space of an internal combustion engine during the operation of the latter.

In a preferred refinement of the pressure sensor, there is provision for it to have an outer sensor housing for fastening to a component delimiting the combustion space, the sleeve being received in the sensor housing and being fastened only with an end region formed at its first end to the sensor housing. By the sleeve being independent of the sensor set-up, the pressure sensor measuring element remains free of influences, caused by installation forces.

Preferably, the outer sensor housing has a tool engagement point or tool engagement region with tool engagement surfaces for a tool. This may be, for example, a wrench and, in particular, an open-end wrench. The pressure sensor can consequently be screwed by means of a screw-in thread in a pressure- and vibration-resistant manner into an internal thread of a housing containing the medium to be measured, for example into an internal thread on an engine block surrounding a combustion space or into an internal thread on a pipe or a container of a hydraulic system.

In order to make screwing in easier, for example so that pressure can be exerted in the screw-in direction via the tool, in a preferred refinement the tool engagement region is provided, between the screw-in thread and at least one first tool engagement surface, with a projection for guiding the tool, preferably in order to prevent the latter from slipping off toward the screw-in thread.

On the other hand, it is desirable to be able to introduce the pressure sensor or the sensor outer housing into a holding fixture, for example a vice, for example for the purpose of machining during production or maintenance. In order to make introduction and removal possible also in the longitudinal direction of the pressure sensor, in a further-preferred refinement there is provision for at least two mutually opposite second tool engagement surfaces to be formed continuously, without a projection, in such a way that they have the outermost radial extent of the pressure sensor on an angular range, covered by the second tool surfaces, in relation to the longitudinal mid-axis of the pressure sensor.

In a preferred refinement, a simple sensor element for engine pressure sensors is provided. The sensor element is preferably a two-part measuring element. This measuring element is preferably composed of a dual diaphragm plunger (plunger with two diaphragms) and of an outer sleeve. The dual diaphragm plunger has a one-part connection between a combustion space diaphragm and a measuring diaphragm. By the measuring element being formed by two diaphragms, for example, rigidity can be adjusted via the thickness of the diaphragms and deflections can be kept low. A typical thickness for the thinnest point of the combustion space diaphragm designed as an annular diaphragm is about 0.2 mm. A typical thickness of the thinnest point of the measuring diaphragm likewise designed as an annular diaphragm is about 0.32 mm.

The form with two diaphragms has the further advantage that the two diaphragms achieve surprisingly effective temperature partitioning for the protection of the force sensor technology lying behind them, despite that ceramics are dispensed with, along with the associated problems of composite material bonds.

Some advantages of a design, as above, are mentioned:
the minimal number of parts;
a minimal error of alignment due to the one-part type of construction, thus also giving rise to good linearity and also to a useful hysteresis property;
the one-part type of construction is distortion-free;
there are, in particular, no thermal stresses when welding is carried out for mounting the plunger between two diaphragms;
there is identical thermal expansion because the same material is used for all parts of the pressure measuring cell;
the diaphragm plunger, outer sleeve, flexural beam and sensor body can be formed from the same material;
there is a greater safety because of the double diaphragm;
the measuring element is free of sensor installation forces on account of the separate type of construction In a further refinement, a vacuum is provided in the interspace of the measuring cell in order to avoid convection.

A further refinement relates to a shadow giver or radiation barrier in the direction of the measuring diaphragm. For example, the measuring element could have a filling, for example silica sand. This serves for safety in the event of a front diaphragm fracture.

A further additional idea relates to a central bore for a temperature resistance probe. A temperature rise (heat wave) is thereby detected earlier, and this can be used for temperature compensation.

BRIEF DESCRIPTION OF THE DRAWINGS

An exemplary embodiment of invention is explained in more detail below by means of the accompanying drawing in which:

FIG. 1 shows a side view of a pressure sensor for the measurement of combustion space pressures;

FIG. 2 shows a longitudinal section through the pressure sensor of FIG. 1;

FIG. 7 shows a top view of an end, facing away from the combustion space, of a pressure measuring unit of the pressure sensor of FIG. 1;

FIG. 8 shows a first sectional view through the pressure measuring unit of FIG. 7 along a first mid-plane;

FIG. 13 shows a perspective illustration of the radiation barrier used in the embodiment according to FIG. 12.

DETAILED DESCRIPTION OF EMBODIMENTS

Figure 3:
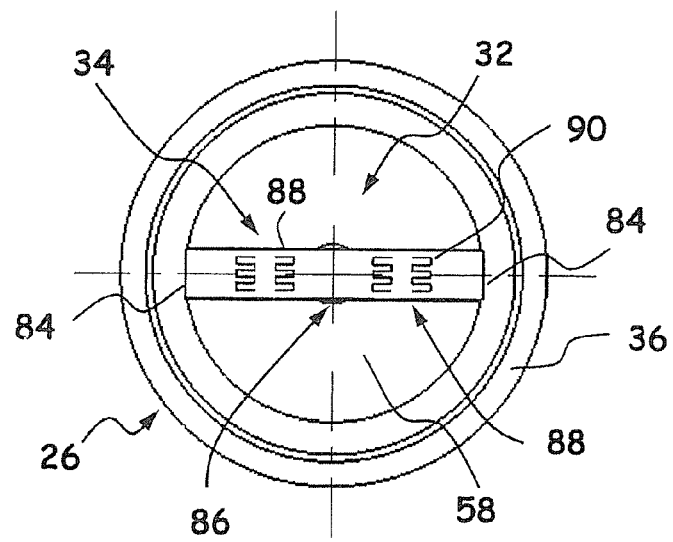
FIG. 3 shows a top view of an end, facing away from the combustion space, of a pressure sensor measuring element of the pressure sensor of FIG. 1.

FIGS. 1 and 2 illustrate an embodiment of a pressure sensor 10 for the measurement of pressures in a combustion space of an internal combustion engine, such as, for example, a diesel engine for ships, construction machines or motor vehicles or a gasoline engine for motor vehicles or the like. The combustion space pressure can be measured online by means of the pressure sensor 10 while the internal combustion engine is in operation. On the basis of the pressure signal, control and regulation for operating the internal combustion engine can be carried out, and the operation and functioning of the internal combustion engine can be monitored.

The pressure sensor 10 has a pressure measuring unit 14 at a first end 12 intended to face the combustion space and a cable 18 at the second end 16 facing away from the combustion space. The cable 18 is connected to the pressure measuring unit 14 via a cable connection 20 and a spacer sleeve 22.

The pressure measuring unit 14 has an outer sensor housing 24 and a pressure sensor measuring element 26. The sensor housing 24 is provided on its outer circumference with a thread 28 for screwing into a boundary wall 29 of the combustion space. The pressure sensor measuring element 26 is received inside the sensor housing 24.

Figure 4:
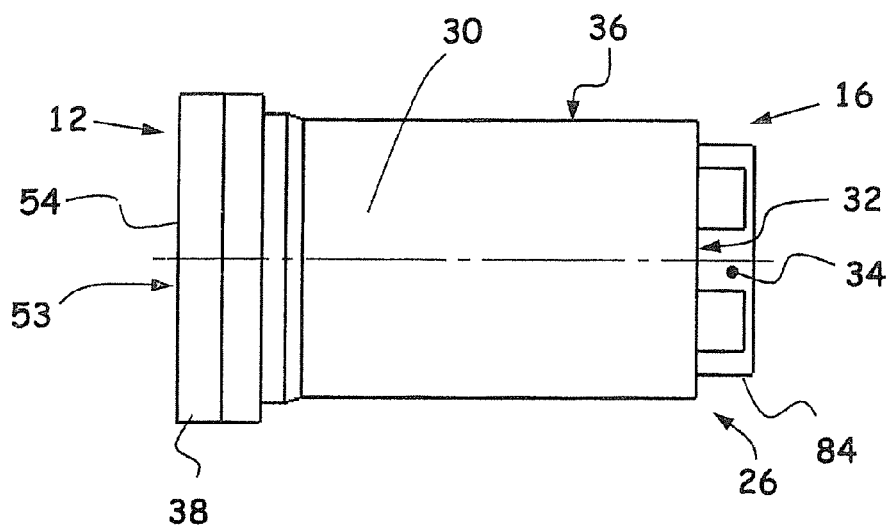
FIG. 4 shows a side view of the pressure sensor measuring element of FIG. 3.

As is evident from FIGS. 3 and 4, the pressure sensor measuring element 26 has a pressure measuring cell 30 and a force measuring element 32 in the form of a flexural beam 34.

Figure 5:
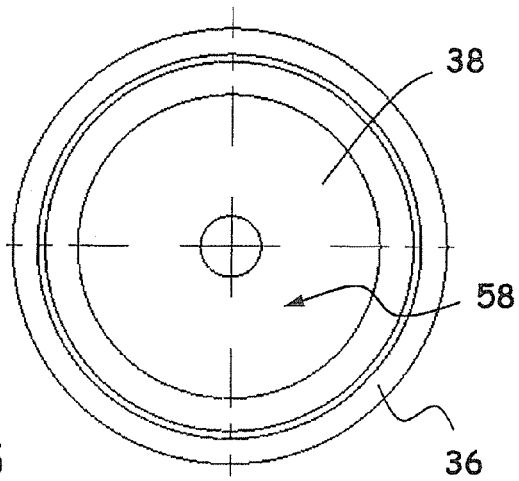
FIG. 5 shows a top view of an end, facing away from the combustion space, of a pressure measuring cell of the pressure sensor measuring element.

The pressure measuring cell 30 is described below with reference to FIGS. 5 and 6. The pressure measuring cell 30 has only two structural elements or parts, to be precise a sleeve 36 and a diaphragm/plunger unit 38, here in in the form of a dual diaphragm plunger 40, received therein.

The sleeve 36 has an essentially cylindrical design. At the first end 12, the sleeve 36 has on its outer circumference a radially outward-extending flange 42. An axial annular projection 44 extends from the flange 42 further on in the axial direction toward the combustion space side, so that a step 46 is formed between the annular projection 44 and flange 42 on the outside. A sleeve wall 47 in the form of a cylindrical region 48 of the sleeve 36 is formed on the opposite side of the flange 42, there being first a thicker region 50 with a larger diameter and then a longer thinner region 52 with a smaller wall thickness and smaller outside diameter. The sleeve 36 is produced in one piece and is worked out from a larger metal piece by material-removing shaping.

The diaphragm/plunger unit 38 is likewise produced in one piece. It, too, is worked out from a single metal piece by material-removing shaping.

The diaphragm/plunger unit 38 has as a first part region, a first diaphragm 53 in the form of a separating diaphragm 54 and as a second part region a plunger 56. In the embodiment illustrated here, a second diaphragm 57 in the form of a measuring diaphragm 58 is also provided as a third part region, with the result that the diaphragm/plunger unit 38 is designed as a dual diaphragm plunger 40.

The first diaphragm 53 has a thicker annular edge region 60, an annular diaphragm region 62 and a central transitional region 63 which divides them in a transition-like manner by means of the plunger 56. The thicker annular edge region 60 extends with a circumferential flange 64 in the direction of the second end 16 and is seated on the step 46 where it is connected to the sleeve 36 in a materially integral manner by means of a weld 66. The first end 12 of the sleeve 36 is thereby closed hermetically by means of the separating diaphragm 54. The annular diaphragm region 62 forms a thinner flexural region at which the separating diaphragm 54 can be deformed movably in the axial direction under the action of pressure. The thinnest point of the annular diaphragm region 62 of changing thickness is less than 0.3 mm, in particular about 0.2 mm thick. To assist deflection, a notch 67 may also be provided on the separating diaphragm 54, here in the region of the transition between the annular edge region 60 and the annular diaphragm region 62. The outside diameter of the separating diaphragm 54 corresponds to the outside diameter of the flange 42, so that the sleeve 36 and the separating diaphragm 54 are flush at the end region 68 formed with the first end 12.

The plunger 56 extends centrally inside the sleeve 36 from the separating diaphragm 54 and goes from the first end 12 in the direction of the second end 16. In the embodiment illustrated, it connects the separating diaphragm 54 to the measuring diaphragm 58, so that, when the separating diaphragm 54 is deflected, the measuring diaphragm 58 is likewise deflected. The plunger 56 has an orifice 70, accessible from the second end 16, in the form of a central bore 72. This bore 72 may serve for receiving a temperature measuring probe (not illustrated).

The measuring diaphragm 58 likewise has a thicker annular edge region 74, an annular diaphragm region 76 designed as a flexural zone and a central transitional region 78 which divides them by means of the plunger 56. The outside diameter of the annular edge region 74 is somewhat smaller than the inside diameter of the sleeve 36, said inside diameter being uniform over the length of the sleeve 36, so that said annular edge region can be introduced into the sleeve 36 during the production of the pressure measuring cell 30. At the second end 16, the measuring diaphragm 58 is flush with the sleeve 36. The annular edge region 74 is connected firmly to the sleeve 36 by means of a weld 80. The annular diaphragm region 76 of the measuring diaphragm 58 is designed to be thicker than the annular diaphragm region 62 of the separating diaphragm 54.

Figure 6:
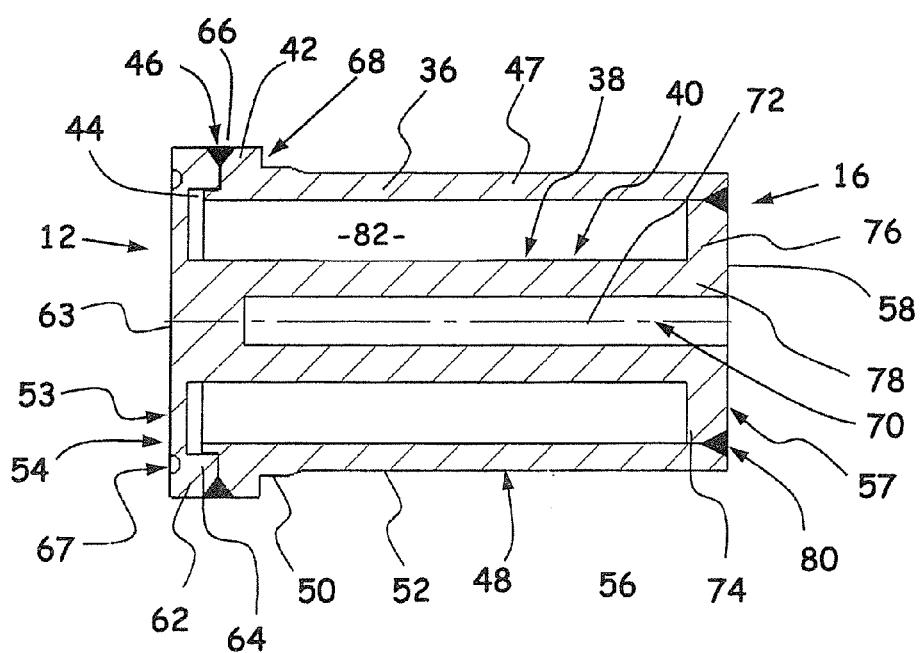
FIG. 6 shows a sectional view of the pressure measuring cell of FIG. 5 along a mid-plane.

In the embodiment of the pressure measuring cell 30, as depicted in FIG. 6, a cavity 82 formed inside the pressure measuring cell 30 evacuates.

As is evident from FIGS. 3 and 4, the flexural beam 34 is welded with its outer region 84 to the second end 16 of the sleeve 36. The flexural beam 34 is connected by means of a middle region 86 to the outside of the transitional region 78 of the measuring diaphragm 58 likewise by welding. In between, the flexural beam 34 has thinner deflection regions 88 which are provided with strain gauges 90, so that their deflection can be used for generating an electrical signal.

The entire pressure measuring cell 30 with the two parts of the pressure sensor measuring element 26 and with the flexural beam 34 is manufactured from uniform material. For this purpose, in the exemplary embodiment, a suitable steel is used.

Figure 9:
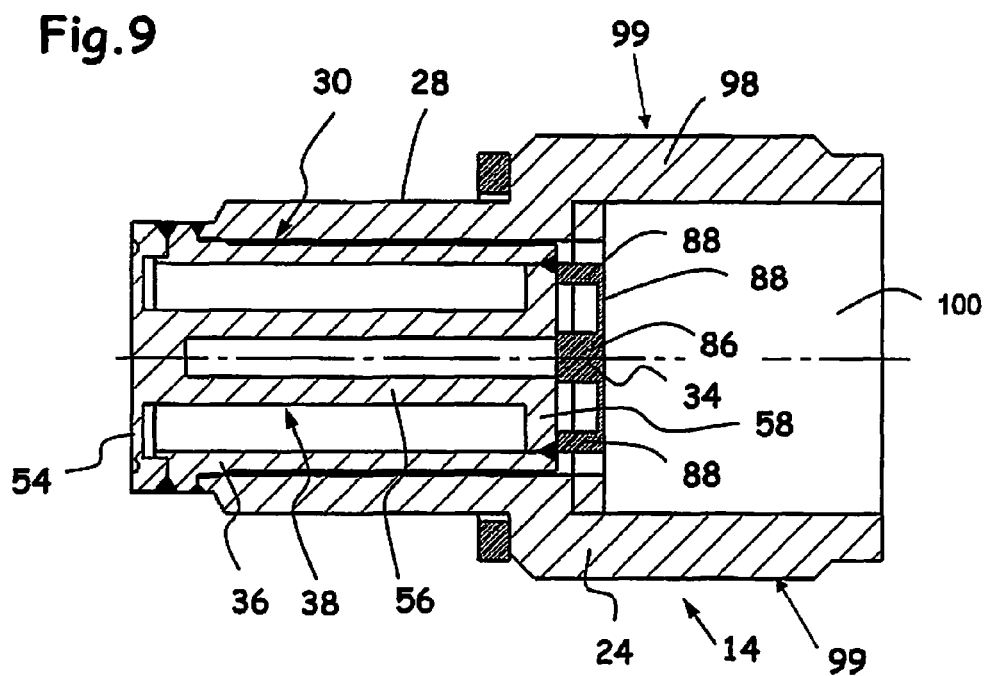
FIG. 9 shows a second sectional view through the pressure measuring unit of FIG. 7 along a second mid-plane perpendicular to the first mid-plane.
Figure 10:
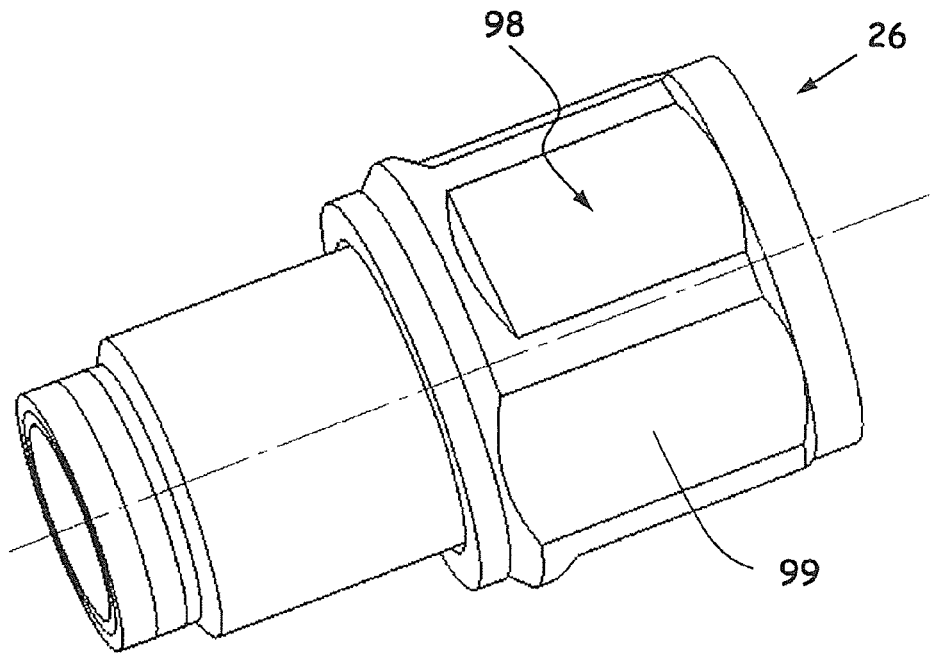
FIG. 10 shows a perspective view of a screw-in region of the pressure sensor with a tool engagement point.

As is evident from FIGS. 7 to 9, the pressure measuring cell 30 is introduced into an end, open on the combustion space side, of the sensor housing 24, so that the flange 42 butts against the end edge 92 of the sensor housing 24. This end edge 92 is connected firmly to the flange 42 and to the thicker region 50 by means of a weld 94.

The sensor housing 24 has on a shank region 96 the thread 28. This is followed toward the second end 16 by a tool engagement region in the form of a hexagon 98.

The hexagon 98 has four first tool engagement surfaces 102, in each case a projection 104 for guiding a tool (not illustrated), for example an open-end wrench or the like, and for preventing it from slipping off being provided between the first tool engagement surfaces 102 and the thread 28. Two mutually opposite second tool engagement surfaces 99 are formed continuously, without a projection, in such a way that the pressure sensor 10 can be introduced overall in the longitudinal direction, for example, between two clamping jaws (not illustrated), even if the clamping jaws are loosened only slightly. The second tool engagement surfaces 99 are designed as parallel continuous wrench engagement surfaces.

The sensor housing 24 is provided toward the second end 16 with a larger recess 100 for the reception of electronics (for example, a chip or ASIC, not illustrated in any more detail here). The sole firm mechanical connection between the pressure measuring cell 30 and the sensor housing 24 is found in the weld 94 at the end region 68. The pressure measuring cell 30 and the sensor housing 24 can expand differently inward in the axial direction in the event of temperature changes.

Even though the pressure sensor 10 is described by way of example of use for online measurement of combustion space pressures and is especially suitable for this purpose, other types of use are, of course, also possible. The pressure sensor 10 is, for example, likewise eminently suitable for the use of pressures in hydraulic systems, even in the case of hot or aggressive hydraulic media.

Figure 11:
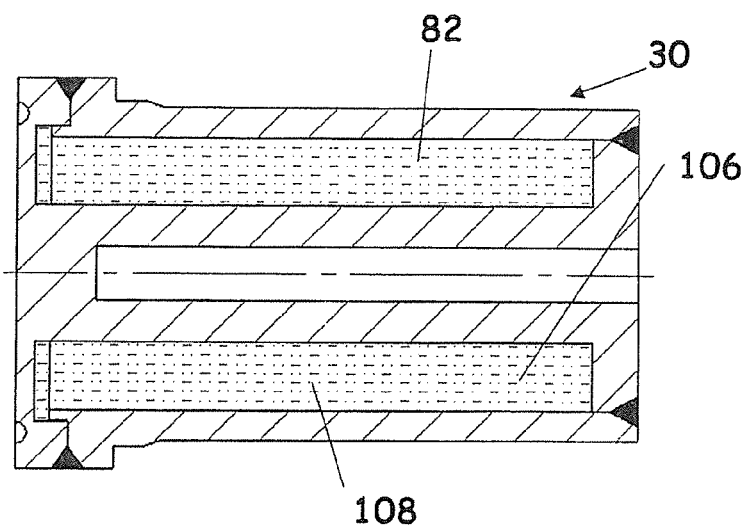
FIG. 11 shows a sectional view, comparable to FIG. 6, of a further embodiment of the pressure measuring cell with a filling.

Further exemplary embodiments of the pressure measuring cell 30 for use in the pressure sensor 10 are described below by means of the illustration of FIGS. 11 to 13. In this case, only the differences in relation to the embodiment of the pressure measuring cell 30, as illustrated in FIGS. 5 and 6, are explained. All other constituents and features are identical to those of the embodiment explained above.

In the embodiment according to FIG. 6, the cavity 82 of the pressure measuring cell 30 is evacuated inside it. The purpose of this is to cause as little heat as possible to be conducted through the cavity 82. By contrast, in the second embodiment of the pressure measuring cell 30 according to FIG. 11, the cavity 82 is filled with a filling 106 composed of thermally separating material. In the exemplary embodiment illustrated, the material is in the form of flowable granular material. In actual fact, in this example, silica sand 108 is used.

Figure 12:
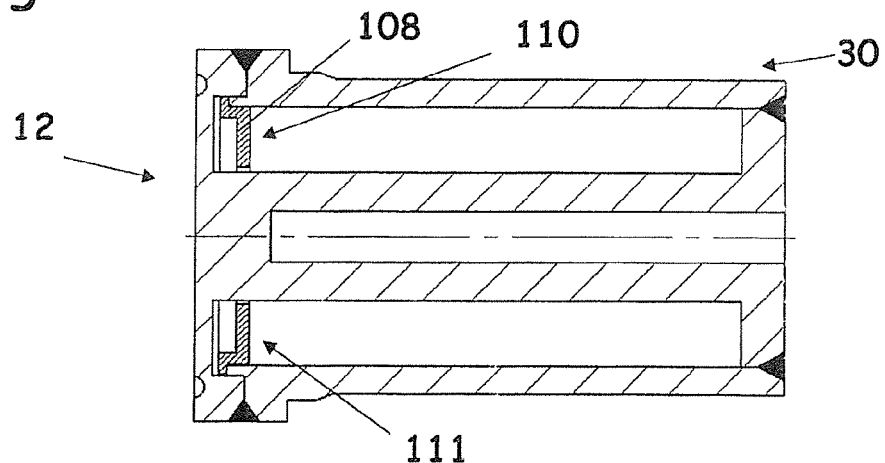
FIG. 12 shows a sectional view, comparable to FIG. 6, of yet a further embodiment of the pressure measuring cell with a radiation barrier.

In the embodiment according to FIG. 12, a radiation barrier 109, which is individually illustrated in more detail in FIG.

13, is provided in the cavity 82 in the region of the first end 12. The radiation barrier 109 has two individual elements 110 and 111 which are separated from one another and are adapted to the shape of the cavity 82 and which can be introduced more simply into the cavity 82 individually. Any material which attenuates heat radiation or other harmful radiation will be considered as material for the radiation barrier 109.

The invention claimed is:

1. A pressure sensor measuring element for detecting pressure in a combustion space of an internal combustion engine, the pressure sensor measuring element comprising:
    a separating diaphragm;
    a plunger configured to transmit deflections of the separating diaphragm to a force measuring element; and
    a sleeve that is configured to receive the plunger and which is closed by the separating diaphragm at a first end arranged to face the combustion space, the sleeve being further configured to hold the force measuring element at a second end that is opposite to the first end;
    the force measuring element being configured as a flexural beam with a strain gauge, and the force measuring element being fastened at one end to the second end of the sleeve and at another end to an end of the plunger which faces away from the separating diaphragm; and
    the plunger being configured integrally with the separating diaphragm as a diaphragm/plunger unit, and the plunger, the sleeve and the diaphragm/plunger unit being formed from the same metal material.

2. The pressure sensor measuring element as claimed in claim 1, wherein
    at least one of the diaphragm/plunger unit and the sleeve is a single monolithic piece.

3. The pressure sensor measuring element as claimed in claim 1, wherein
    the diaphragm, the plunger and the sleeve include a uniformly identical material.

4. The pressure sensor measuring element as claimed in claim 1, wherein
    the sleeve and the separating diaphragm are fastened to one another in a materially integral manner by a weld.

5. A pressure sensor for detecting the pressure in the combustion space of the internal commission engine during operation of the internal combustion engine, the pressure sensor comprising a pressure sensor measuring element as claimed in claim 1.

6. The pressure sensor as claimed in claim 5, further comprising
    an outer sensor housing configured to fasten to a component delimiting the combustion space, the sleeve being received in the sensor housing and being fastened with an end region formed at its first end to the sensor housing.

7. The pressure sensor as claimed in claim 6, wherein
    the outer sensor housing includes a tool engagement region with tool engagement surfaces for a tool.

8. A method for measuring pressures in combustion spaces of an internal combustion engine or in hydraulic systems during the operation of the internal combustion engine or the hydraulic system, the method including operating the pressure sensor as claimed in claim 5 to measure the pressures in the combustion spaces.

9. A method for measuring pressures in combustion spaces of an internal combustion engine or in hydraulic systems during the operation of the internal combustion engine or the hydraulic system, the method including operating a pressure sensor measuring element as claimed in claim 1 to measure the pressures in the combustion spaces.

10. A pressure sensor measuring element for detecting pressure in a combustion space of an internal combustion engine, the pressure sensor measuring element comprising:
    a separating diaphragm;
    a plunger configured to transmit deflections of the separating diaphragm to a force measuring element; and
    a sleeve that is configured to receive the plunger and which is closed by the separating diaphragm at a first end arranged to face the combustion space, the sleeve being further configured to hold the force measuring element at a second end that is opposite to the first end;
    the plunger being configured integrally with the separating diaphragm as a diaphragm/plunger unit, and the sleeve and the diaphragm/plunger unit being formed from the same metal material;
    the sleeve including a radially outward-extending flange at the first end and an annular projection projecting from the flange with a smaller outside diameter axially in the direction of the separating diaphragm; and
    the separating diaphragm having an outer thickened annular edge region which is flush with the flange on the outside and engages over the annular projection on the inside.

11. The pressure sensor measuring element as claimed in claim 10, wherein
    the force measuring element is fastened at one end to the second end of the sleeve and at another end to an end of the plunger which faces away from the separating diaphragm.

12. The pressure sensor measuring element as claimed in claim 10, wherein
    at least one of the diaphragm/plunger unit and the sleeve is a single monolithic piece.

13. A pressure sensor measuring element for detecting pressure in a combustion space of an internal combustion engine, the pressure sensor measuring element comprising:
    a separating diaphragm;
    a plunger configured to transmit deflections of the separating diaphragm to a force measuring element; and
    a sleeve that is configured to receive the plunger and which is closed by the separating diaphragm at a first end arranged to face the combustion space, the sleeve being further configured to hold the force measuring element at a second end that is opposite to the first end;
    the plunger being configured integrally with the separating diaphragm as a diaphragm/plunger unit, and the sleeve and the diaphragm/plunger unit being formed from the same metal material; and
    the sleeve defining a cavity between a sleeve wall and the diaphragm/plunger unit, the cavity being evacuated or being filled with solid particles composed of a material with a higher melting point than at least one of combustion space temperatures and a radiation barrier.

14. The pressure sensor measuring element as claimed in claim 13, wherein
    at least one of the diaphragm/plunger unit and the sleeve is a single monolithic piece.

15. A pressure sensor measuring element for detecting pressure in a combustion space of an internal combustion engine, the pressure sensor measuring element comprising:
    a separating diaphragm;
    a plunger configured to transmit deflections of the separating diaphragm to a force measuring element; and
    a sleeve that is configured to receive the plunger and which is closed by the separating diaphragm at a first end arranged to face the combustion space, the sleeve being further configured to hold the force measuring element at a second end that is opposite to the first end;

the plunger being configured integrally with the separating diaphragm as a diaphragm/plunger unit, and the sleeve and the diaphragm/plunger unit being formed from the same metal material; and the plunger defining an orifice that is accessible from the second end of the sleeve and extends in a longitudinal direction of the sleeve.

16. The pressure sensor measuring element as claimed in claim 15, wherein
at least one of the diaphragm/plunger unit and the sleeve is a single monolithic piece.

17. A pressure sensor for detecting the pressure in the combustion space of the internal commission engine during operation of the internal combustion engine, the pressure sensor comprising:
a pressure sensor measuring element for detecting pressure in a combustion space of an internal combustion engine, the pressure sensor measuring element comprising:
a separating diaphragm;
a plunger configured to transmit deflections of the separating diaphragm to a force measuring element; and
a sleeve that is configured to receive the plunger and which is closed by the separating diaphragm at a first end arranged to face the combustion space, the sleeve being further configured to hold the force measuring element at a second end that is opposite to the first end; and
the plunger being configured integrally with the separating diaphragm as a diaphragm/plunger unit, and the sleeve and the diaphragm/plunger unit being formed from the same metal material; and
an outer sensor housing configured to fasten to a component delimiting the combustion space, the sleeve being received in the sensor housing and being fastened with an end region formed at its first end to the sensor housing;
the outer sensor housing including a tool engagement region with tool engagement surfaces for a tool; and
the tool engagement region including, between a thread for screwing in the pressure sensor and at least one first tool engagement surface, a projection configured to guide the tool to prevent the tool from slipping off toward the thread, and the tool engagement region further including at least two mutually opposite second tool engagement surfaces that are formed continuously, without a projection, as an outermost radial extent of the pressure sensor on an angular range, covered by the second tool surfaces, in relation to the longitudinal mid-axis of the pressure sensor.

18. The pressure sensor as claimed in claim 17, wherein
at least one of the diaphragm/plunger unit and the sleeve is a single monolithic piece.

19. A pressure sensor measuring element for detecting pressure in a combustion space of an internal combustion engine, the pressure sensor measuring element comprising:
a separating diaphragm;
a plunger configured to transmit deflections of the separating diaphragm to a force measuring element; and
a sleeve that is configured to receive the plunger and which is closed by the separating diaphragm at a first end arranged to face the combustion space, the sleeve being further configured to hold the force measuring element at a second end that is opposite to the first end;
the plunger being configured integrally with the separating diaphragm as a diaphragm/plunger unit, and the plunger, the sleeve and the diaphragm/plunger unit being formed from the same metal material;
the diaphragm/plunger unit including, at an end of the plunger which is opposite to the separating diaphragm, a second diaphragm which is flush with the second end of the sleeve; and
the force measuring element being fastened at one end to the second end of the sleeve and at another end to an end of the plunger which faces away from the separating diaphragm.

20. A pressure sensor measuring element for detecting pressure in a combustion space of an internal combustion engine, the pressure sensor measuring element comprising:
a separating diaphragm;
a plunger configured to transmit deflections of the separating diaphragm to a force measuring element; and
a sleeve that is configured to receive the plunger and which is closed by the separating diaphragm at a first end arranged to face the combustion space, the sleeve being further configured to hold the force measuring element at a second end that is opposite to the first end;
the plunger being configured integrally with the separating diaphragm as a diaphragm/plunger unit, and the sleeve and the diaphragm/plunger unit being formed from the same metal material;
the diaphragm/plunger unit including, at an end of the plunger which is opposite to the separating diaphragm, a second diaphragm which is flush with the second end of the sleeve;
the sleeve including a radially outward-extending flange at the first end and an annular projection projecting from the flange with a smaller outside diameter axially in the direction of the separating diaphragm; and
the separating diaphragm having an outer thickened annular edge region which is flush with the flange on the outside and engages over the annular projection on the inside.

* * * * *